Aug. 21, 1962 B. STEPANSKI ETAL 3,050,436
METHOD OF DELAMINATING CEMENTED GLASS OPTICS OR LENSES
Filed Oct. 26, 1959
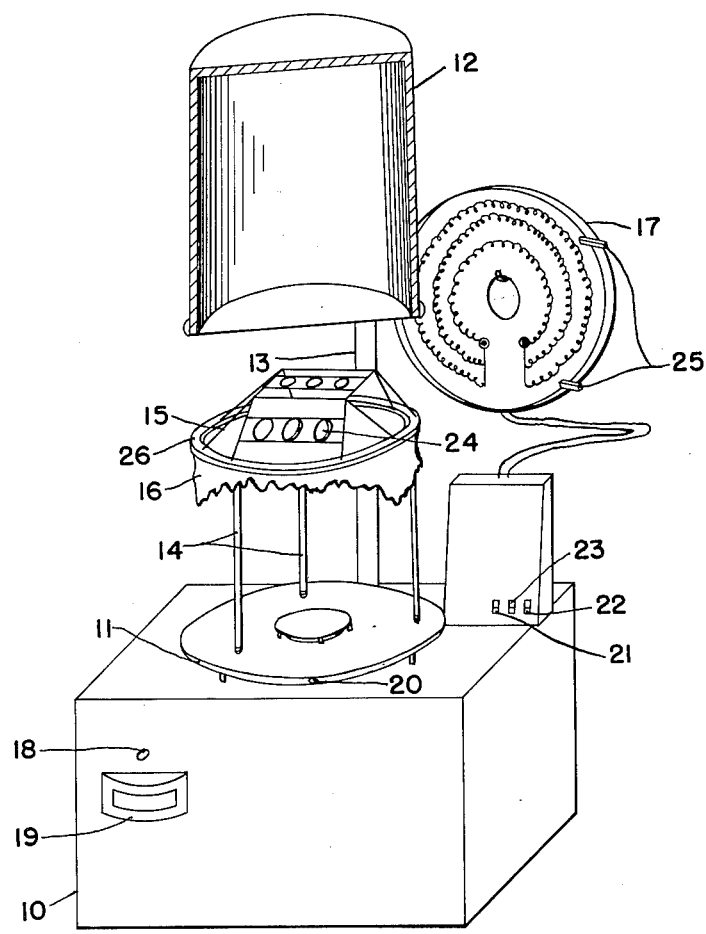
INVENTORS
BERNARD STEPANSKI
ALAN L. SMITH
JOSEPH WERTHWINE
BY
ATTORNEYS ём
United States Patent Office 3,050,436
Patented Aug. 21, 1962

3,050,436
METHOD OF DELAMINATING CEMENTED GLASS OPTICS OR LENSES
Bernard Stepanski, Alan L. Smith, and Joseph Werthwine, Philadelphia, Pa., assignors to the United States of America as represented by the Secretary of the Army
Filed Oct. 26, 1959, Ser. No. 848,877
1 Claim. (Cl. 156—344)
(Granted under Title 35, U.S. Code (1952), sec. 266)

The invention described herein may be manufactured and used by or for the Government for governmental purposes without the payment to us of any royalty thereon.

This invention relates to methods of delaminating or decementing glass optics, and more especially to an improved delaminating method which may be carried out with previously available apparatus and is effective to decement optics of the rare earth type with a percentage of loss much lower than that heretofore realized.

A new thermosetting cement which is better able to withstand extremes in temperature has largely superseded Canada Balsam as an optical cement. This new cement is a thermosetting resin consisting in general of an unsaturated polyester (60% by weight) dissolved in a polymerizable solvent (40% by weight). It requires decementing procedures that are more complicated and tedious than those employed with Canada Balsam.

This is particularly true in decementing rare earth doublets. A rare earth lens may be defined as one containing an oxide or oxides of at least one of the rare earth elements, such, for example, as lanthanum, cerium, neodymium, etc. The sensitivity of rare earth elements to temperature differentials and stray air currents has resulted in a large percentage of breakage during the decementing process. With the cost of rare earth at its present level, this breakage results in a considerable loss of material value.

All delaminating methods are based on raising the temperature of the doublet or submitting it to thermal shock. With either method, one element tends to expand or contract more rapidly than the other. When the temperature change is great or rapid or both, the effect is to develop a shearing strain between the cement layer and the glass. Thus, shearing strain per unit thickness of the cement will increase as the thickness of the cement film decreases. This shearing stress is produced because the cement or the glass must bend or stretch as a result of the difference in thermal expansion. Strains arising from temperature changes or thermal shock which can be absorbed by the bending or stretching of the glass or cement are useless for delamination purposes. On the other hand, if the shock is so great that the glass breaks, no useful result is accomplished.

Prior to the present invention, two methods of decementation have been used. In the first, the cemented lenses are placed crown down in a glass beaker or metal skillet filled with castor oil. The bottom of the beaker or skillet is covered with spun glass cloth to prevent scratching the polished surfaces. The glass beaker or metal skillet containing the castor oil and cemented lenses is heated until the castor oil attains a temperature of approximately 450° F. The acceleration and temperature requirements vary with each type of lens depending entirely on the amount of strain which the glass and design will allow without cracking the optical elements. Lenses are soaked at this temperature until the cement fractures enough to allow separation. Laboratory tongs are used to remove the partially decemented lenses from the castor oil. The partially decemented lenses are placed in a decementing holder. Then pressure is applied with a wooden stick to completely separate the elements or until the lenses are decemented or delaminated. Obstinate cases may require longer heating periods in the castor oil. The separated lenses are cooled between several layers of dry cheese cloth to prevent contact with drafts. The delaminated lenses are rinsed in acetone to remove any residual cement. This is done by submerging them in the solvent and scrubbing with a swab or soft cheese cloth.

Using the second procedure, the cemented lenses or elements are placed on an electric hot plate at room temperature. The hot plate surface is covered with a sheet of asbestos paper to prevent scratching the polished surface. The temperature of the plate is raised to approximately 400° F. This temperature is maintained until a diffraction ring pattern is visible on the cemented lens. The cemented lens is picked up by a pair of laboratory tongs and passed back and forth through a Bunsen burner flame. When the cement between the elements starts to separate, each element is grasped with clean gloved hands and the elements are forced apart. After the elements have cooled, the cement is removed by submerging the elements in acetone and scrubbing them with a soft swab of cheese cloth.

The decementing method of the present invention is distinguished from the above-described methods in that it (1) does not involve an open gas flame or hot liquids, (2) allows the operator to perform other duties while the decementing takes place, (3) applies to all types of optical glass (4) utilizes an all inclusive solvent for removing the cement which adheres to the separate delaminated lens elements and (5) is capable of being performed with apparatus which is already available for another purpose.

This apparatus, as indicated by the single figure of the drawing, is a conventional vacuum lens coating unit or machine. The construction and operation of such machines are well understood by those skilled in the art. Parts not utilized in carrying out the decementing method of the present invention are not shown in the drawing.

The machine includes a frame 10 upon which is supported the base plate 11 of a vacuum chamber in the form of a hood 12. The hood 12 is movable along rod 13 into and out of sealing engagement with the base plate 11. Supported upon the base plate 11 by means of rods 14 is a lens rack 15. All these parts are easily recognized as elements of a conventional lens coating unit.

This unit is adapted to carry out the present invention by two simple modifications, the first of which is to place a sheet of aluminum foil 16 under the rack 15 and the second of which is to place a dome heater 17 on top of the rack 15. The function of the aluminum foil is to minimize the time required to obtain the operating temperature and to catch any falling lenses. With these modifications, the lens coating unit is in a condition to carry out the decementing method of the present invention.

In accordance with this method, a knob 18 is set to indicate a temperature of 330° C. on an indicator 19, the dome heater 17 is placed over the lens rack 15 with its feet 25 resting on the rim 26 of rack 15, the lenses 24 to be decemented are placed on the rack 15, the vacuum chamber or hood 12 is moved down into sealing engagement with the base plate 11, the vacuum valve 20 is closed, the master switch 21 is closed, a switch 22 is closed for starting a mechanical vacuum pump, and a switch 23 is closed to admit current to the Nichrome elements of the dome heater 17. The indicator 19 functions during the lens heating period to interrupt the heater current whenever it exceeds the set value.

Heating of the lenses is continued for a period of 20 minutes after they have reached a temperature of 330° C. During this heating cycle, the applied voltage may be 120 and the vacuum may be maintained at 0.05 mm. Hg.

At the end of the heating period, the power to the dome heater is shut off and the pressure within the vacuum chamber is equalized by slightly opening the vacuum valve 20. Thereafter the hood 12 is raised and the dome heater is removed from the rack.

The importance of equalizing the pressure at the completion of the heating cycle cannot be over emphasized. A sudden release of the vacuum is likely to fracture lenses, especially of the rare earth type, and thus circumspection must be exercised to very slowly crack vacuum valve 20. The temperature should be reduced to the ambient room temperature before the lenses are handled. This usually requires a period of 20 to 30 minutes.

Extreme care is required in manipulating rare earth lenses. Any stray air currents may fracture them. After decementation, they are placed in a pan containing a solvent such as acetone. An immersion of the lenses in this solution for a period of 2½ hours is usually sufficient to remove any cement left on the lenses. Upon removal from this solution, the lenses are rinsed off in alcohol and dried with cheese cloth.

While the above-mentioned temperature of 330° C. and times of 20 and 20 to 25 minutes have been found to be optimum, they may be varied over a limited range without seriously decreasing the effectiveness of the method herein disclosed. Thus the 330° C. temperature may vary over a range ±5° C. and the heating cycle may vary over a range of ±2 minutes. Increase in the temperature of the heating cycle, of course, decreases the time required for decementation and vice versa.

We claim:

The process of separating optical rare earth lenses cemented together with a thermosetting resin consisting generally of about 60% by weight of an unsaturated polyester dissolved in about 40% by weight polymerizable solvent and comprising the steps of placing the cemented lenses on a support, resting an electric heater on said support without contacting said lenses, enclosing said support and heater with a vacuum chamber, said vacuum chamber having a valve for permitting ingress of surrounding atmosphere, evacuating said chamber to approximately 0.05 mm. of mercury, applying electric power to said heater while in vacuo until said heater attains about 330° C., maintaining the temperature of the heater at about 330° C. for a period of about 20 minutes, shutting off the electric power to said heater, very slowly cracking the vacuum chamber valve to permit ingress of said surrounding atmosphere until the pressure within the chamber and said surrounding atmosphere are generally equalized, permitting said lenses to reach ambient temperature, removing the chamber to expose said lenses now decemented, placing the decemented lenses in a solvent such as acetone for a period of the order of 2½ hours to remove all traces of cement from said decemented lenses and drying said lenses upon removal from said solvent.

References Cited in the file of this patent

UNITED STATES PATENTS

| | | |
|---|---|---|
| 319,153 | Wells | June 2, 1885 |
| 637,444 | Borsch | Nov. 21, 1899 |
| 1,340,189 | Tillyer | May 18, 1920 |
| 2,443,613 | Fuller | June 22, 1948 |
| 2,548,718 | George et al. | Apr. 10, 1951 |
| 2,629,953 | Von Stackenberg et al. | Mar. 3, 1953 |
| 2,843,925 | Logue et al. | July 22, 1958 |
| 3,000,773 | Shapiro | Sept. 19, 1961 |